United States Patent
Yang et al.

(10) Patent No.: US 11,387,777 B2
(45) Date of Patent: Jul. 12, 2022

(54) ACTIVE BYPASS CONTROL DEVICE AND METHOD FOR PHOTOVOLTAIC MODULE

(71) Applicant: SUNGROW POWER SUPPLY CO., LTD., Anhui (CN)

(72) Inventors: Zongjun Yang, Anhui (CN); Yanfei Yu, Anhui (CN); Hua Ni, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 511 days.

(21) Appl. No.: 16/538,740

(22) Filed: Aug. 12, 2019

(65) Prior Publication Data
US 2020/0067452 A1    Feb. 27, 2020

(30) Foreign Application Priority Data

Aug. 24, 2018  (CN) .......................... 201810973984.X

(51) Int. Cl.
*H02S 50/10*   (2014.01)
*H02J 3/38*    (2006.01)
*H02S 40/30*   (2014.01)

(52) U.S. Cl.
CPC .............. *H02S 50/10* (2014.12); *H02J 3/383* (2013.01); *H02S 40/30* (2014.12)

(58) Field of Classification Search
CPC .......... H02J 3/383; H02S 40/30; H02S 50/10; H02S 40/36; Y02E 10/56
See application file for complete search history.

(56) References Cited

U.S. PATENT DOCUMENTS

| | | | |
|---|---|---|---|
| 2010/0139734 A1 | 6/2010 | Hadar et al. | |
| 2012/0049855 A1* | 3/2012 | Crites | H02S 50/10 |
| | | | 324/537 |
| 2012/0049879 A1* | 3/2012 | Crites | H02S 50/10 |
| | | | 335/11 |

(Continued)

FOREIGN PATENT DOCUMENTS

| | | |
|---|---|---|
| CN | 104506135 A | 4/2015 |
| DE | 202016103031 U1 | 9/2017 |

OTHER PUBLICATIONS

CA European Search Report regarding Application No. 19191051.2 dated Feb. 17, 2020.

*Primary Examiner* — Son T Le
*Assistant Examiner* — Adam S Clarke
(74) *Attorney, Agent, or Firm* — Harness, Dickey & Pierce, P.L.C.

(57) ABSTRACT

An active bypass control device and an active bypass control method for a photovoltaic module are provided. The device includes a power source, a sampling unit, a controller, N first driving circuits, and N first controllable switches. Each first controllable switch is connected between one pair of bypass ports and includes a first switch and a first diode that are antiparallel. The first diode is reversely connected between the pair of bypass ports, and a control end of the first switch is connected to the controller via the corresponding first driving circuit. Based on a sampling signal provided by the sampling unit, the controller determines whether analog quantity information of the first controllable switch meets a predetermined bypass condition. If the predetermined bypass condition is met, the first switch is controlled to be turned on by using the first driving circuit.

9 Claims, 7 Drawing Sheets

(56) References Cited

U.S. PATENT DOCUMENTS

2015/0131187 A1* 5/2015 Krein ............... H01L 31/02021
                                                          361/67
2015/0171628 A1   6/2015 Ponec et al.

* cited by examiner

ACTIVE BYPASS CONTROL DEVICE AND METHOD FOR PHOTOVOLTAIC MODULE

CROSS REFERENCE TO RELATED APPLICATION

The present application claims the priority to Chinese Patent Application No. 201810973984.X, titled "ACTIVE BYPASS CONTROL DEVICE AND METHOD FOR PHOTOVOLTAIC MODULE", filed on Aug. 24, 2018 with the Chinese Patent Office, which is incorporated herein by reference in its entirety.

FIELD

The present disclosure relates to the field of power electronics, in particular to an active bypass control device and an active bypass control method for a photovoltaic module.

BACKGROUND

In the field of photovoltaic power generation, in order to prevent the hot spot effect of a photovoltaic module, a bypass diode is usually arranged in a junction box of the photovoltaic module. In a case that a substring in the photovoltaic module is shaded and the power thereof is insufficient, the current is automatically transferred from the substring to the external parallel diode loop, avoiding heat generation of the abnormal substring as a load, while not affecting the power generation of other substrings. In some module-level products, such as a shutdown device and an optimizer, a diode is also connected in parallel with the output port of the photovoltaic module. In the case of device abnormal shutdown, the branch in which the photovoltaic module is located is bypassed, so that the remaining photovoltaic modules in the same substring are not affected.

The current of a conventional photovoltaic module is generally about 10 A, and the current of a double-sided photovoltaic module even reaches 13 A. When entering the bypass mode, the current flows through the parallel diode. Depending on the performance of the diode, the loss usually ranges from 3 W to 6 W. The large power consumption results in the temperature in the conventional junction box being above 150°. The junction box may heat up and bulge under the continuous high temperature. In this case, the life of the diode is reduced, resulting in reduced reliability of the product. Further, in order to improve heat dissipation, a metal piece having a larger area may be required for the diode, or a potting sealant with better thermal conductivity may be used, or a diode with better performance may be selected, which all result in increase of the cost. In addition, the system loss is large, bringing a certain loss to the system power generation.

SUMMARY

There are provided an active bypass control device and an active bypass control method for a photovoltaic module in the present disclosure, to solve problems in the conventional technology of low reliability, high cost and large system loss.

The following technical solutions are provided in the present disclosure.

In a first aspect, an active bypass control device for a photovoltaic module is provided. The active bypass control device includes a power source, a sampling unit, a controller, N first driving circuits, and N first controllable switches, where N is a positive integer, where an output end of the power source is connected to a power supply end of the controller;

an output end of the sampling unit is connected to an input end of the controller;

each of the N first controllable switches is connected between one of N pairs of bypass ports corresponding to the first controllable switch, and the first controllable switch includes a first switch and a first diode that are antiparallel, the first diode is reversely connected between the pair of bypass ports, and a control end of the first switch is connected to one output end of the controller via one of the N first driving circuits corresponding to the first controllable switch;

the sampling unit is configured to: detect, for each first controllable switch, analog quantity information of the first controllable switch, and output a sampling signal based on the analog quantity information; and the controller is configured to: determine, based on the sampling signal, whether the analog quantity information of the first controllable switch meets a predetermined bypass condition; and control, in a case that the analog quantity information meets the predetermined bypass condition, the first switch in the first controllable switch to be turned on by using the first driving circuit corresponding to the first controllable switch.

In an embodiment, the controller is further configured to: after controlling the first switch in the first controllable switch to be turned on, control the first switch to be turned off by using the first driving circuit corresponding to the first controllable switch in a case that a time period during which the first switch is turned on exceeds a first preset time period; and determine, based on a sampling signal outputted by the sampling unit after performing re-detecting on the first controllable switch, whether the analog quantity information corresponding to the sampling signal meets the predetermined bypass condition In an embodiment, the controller is further configured to: before determining whether the analog quantity information meets the predetermined bypass condition, perform software filtering on the sampling signal.

In an embodiment, the analog quantity information is one of a voltage, a current, power, and a branch temperature;

in a case that the analog quantity information is the voltage, the predetermined bypass condition is that, the number of times that a voltage of the first controllable switch is lower than a preset voltage threshold is greater than or equal to a preset number of times, or a time period during which the voltage of the first controllable switch is lower than the preset voltage threshold is greater than or equal to a second preset time period;

in a case that the analog quantity information is the current, the predetermined bypass condition is that, the number of times that a current of the first controllable switch is greater than a preset current threshold is greater than or equal to a preset number of times, or a time period during which the current of the first controllable switch is greater than the preset current threshold is greater than or equal to a second preset time period;

in a case that the analog quantity information is the power, the predetermined bypass condition is that, the number of times that power of the first controllable switch is greater than a preset power threshold is greater than or equal to a preset number of times, or a time period during which the power of the first controllable switch is greater than the preset power threshold is greater than or equal to a second preset time period; and in a case that the analog quantity information is the branch temperature, the predetermined bypass condition is that, the number of times that a branch temperature of the first controllable switch is higher than a preset temperature threshold is greater than or equal to a preset number of times, or a time period during which the branch temperature of the first controllable switch is greater than the preset temperature threshold is greater than or equal to a second preset time period.

In an embodiment, the first controllable switch is a triode having a body diode or a switch transistor having a body diode; and the first switch is a relay, a triode or a switch transistor.

In an embodiment, an input end of the power source is connected between two ends of the photovoltaic module.

In an embodiment, the N pairs of bypass ports are arranged between two ends of the photovoltaic module, or the N pairs of bypass ports are arranged between two ends of at least one substring in the photovoltaic module, or the N pairs of bypass ports are arranged between two ends of the photovoltaic module and two ends of at least one substring in the photovoltaic module.

In an embodiment, in a case that the N pairs of bypass ports are arranged between the two ends of the photovoltaic module and the active bypass control device for a photovoltaic module is applied to a shutdown device, the other output end of the controller is connected to a control end of a second controllable switch in the shutdown device via a second driving circuit;

the second controllable switch is connected between the first controllable switch and the photovoltaic module; and the controller is further configured to:

control the second controllable switch to be turned on by using the second driving circuit in a case that the photovoltaic module is in a normal condition; and control the second controllable switch to be turned off by using the second driving circuit in a case that the photovoltaic module is in an abnormal condition.

In a second aspect, there is provided an active bypass control method for a photovoltaic module, applied to the active bypass control device for a photovoltaic module described in the first aspect. The active bypass control method includes:

detecting, by the sampling unit for each first controllable switch, analog quantity information of the first controllable switch, and outputting, by the sampling unit, a sampling signal based on the analog quantity information;

determining, by the controller based on the sampling signal, whether the analog quantity information of the first controllable switch meets a predetermined bypass condition; and controlling, by the controller, the first switch in the first controllable switch to be turned on by using the first driving circuit corresponding to the first controllable switch in a case that the analog quantity information meets the predetermined bypass condition.

In an embodiment, after controlling the first switch in the first controllable switch to be turned on, the active bypass control method further includes:

counting, by the controller, a time period during which the first switch is turned on;

determining, by the controller, whether the time period during which the first switch is turned on exceeds a first preset time period;

controlling, by the controller, the first switch to be turned off by using the corresponding first driving circuit in a case that the time period during which the first switch is turned on exceeds the first preset time period; and re-detecting, by the sampling unit, analog quantity information of the first controllable switch, and re-outputting, by the sampling unit, a sampling signal based on the analog quantity information.

With the active bypass control device for a photovoltaic module provided in the present disclosure, in the case that the controller determines, based on the sampling signal outputted by the sampling unit, that the analog quantity information of the first controllable switch meets the predetermined bypass condition, the controller controls the first switch in the first controllable switch to be turned on by using the first driving circuit corresponding to the first controllable switch, so that the first diode in the first controllable switch is prevented from having a large power consumption, thereby solving the problems in the conventional technology of low reliability, high cost and large system loss caused by the large power consumption of the first diode.

BRIEF DESCRIPTION OF THE DRAWINGS

In order to more clearly illustrate technical solutions in embodiments of the present disclosure or in the conventional technology, the drawings used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION OF EMBODIMENTS

Technical solutions of embodiments of the present disclosure are clearly and completely described in the following in conjunction with the drawings of the embodiments of the present disclosure. Apparently, the embodiments described in the following are only some embodiments of the present disclosure, rather than all the embodiments. Any other embodiments obtained by those skilled in the art based on the embodiments in the present disclosure without any creative work fall in the scope of protection of the present disclosure.

Figure 1:
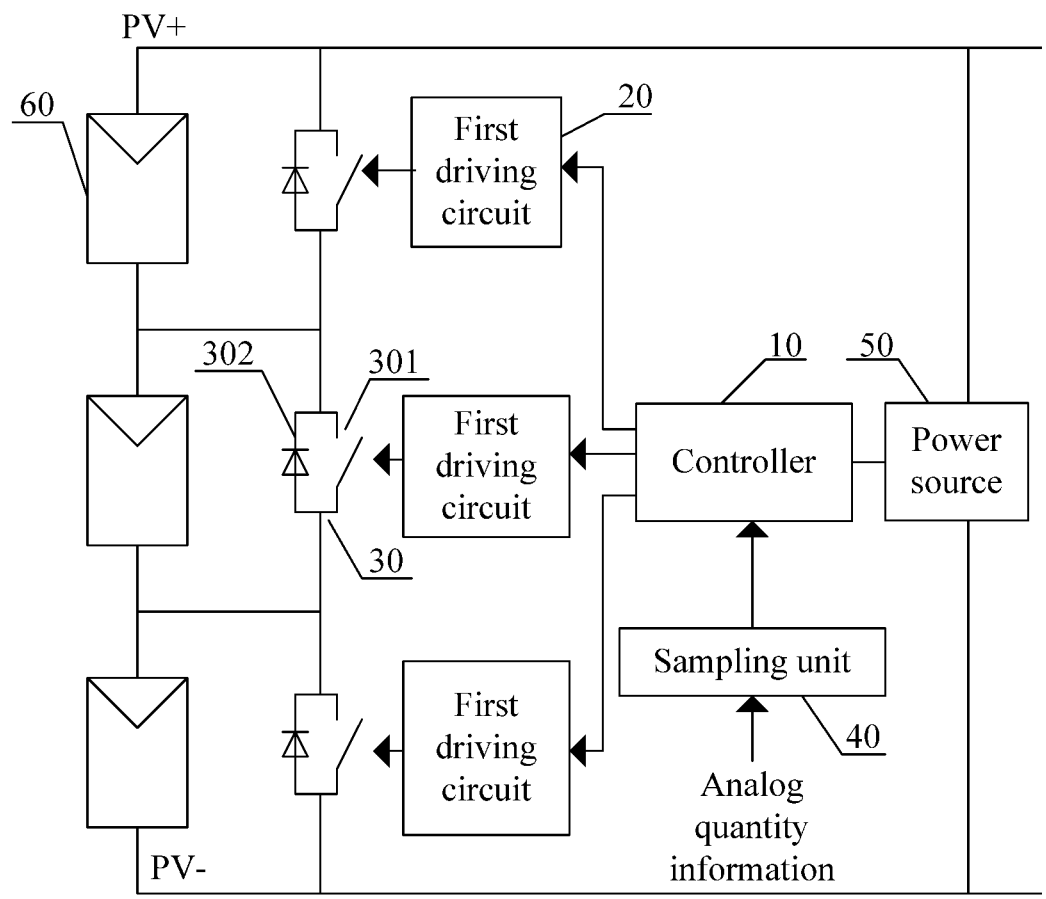
FIG. 1 is a schematic diagram showing an active bypass control device for a photovoltaic module according to an embodiment of the present disclosure.

Reference is made to FIG. 1, which is a schematic diagram showing an active bypass control device for a photovoltaic module according to an embodiment of the present disclosure. In this embodiment, the active bypass control device may include: a power source 50, a sampling unit 40, a controller 10, N first driving circuits 20, and N first controllable switches 30, where N is a positive integer.

An output end of the power source 50 is connected to a power supply end of the controller 10, so that the power source 50 supplies power required for operation of the controller 10. The power source 50 may also supply power required for operation of other modules in the device. In an embodiment, an input end of the power source 50 is connected to the photovoltaic module to take power from the photovoltaic module side. In this case, circuit configuration of the device is simplified, facilitating maintenance and overhaul of the device. Alternatively, the power source 50 is implemented by an independent external power source and is not connected to an output line of the photovoltaic module, which can improve reliability of the device provided in the present disclosure to some extent. In this case, the normal operation of the power source 50 can not be affected by partial failure of the output line of the photovoltaic module, and thus normal power consumption of the controller 10 and other modules connected with the power source 50 can not be affected. It should be noted that the power source 50 is not limited to those described in the embodiment of the present disclosure, as long as the power source 50 can supply the power to the controller 10 and the other modules.

The N first controllable switches 30 are respectively connected between N pairs of bypass ports. In a case that a bypass device is required only for the photovoltaic module, the N pairs of bypass ports are arranged between two ends of the photovoltaic module, and in this case N=1. In a case that a bypass device is required for each of N substrings in the photovoltaic module, each of the N pairs of bypass ports is arranged between two ends of one of the N substrings in the photovoltaic module, and in this case N>1. In a case that a bypass device is required for the photovoltaic module and a bypass device is required for each of (N−1) substrings among the N substrings in the photovoltaic module, one of the N pairs of bypass ports is arranged between the two ends of the photovoltaic module, and each of the remaining (N−1) pairs among the N pairs of bypass ports is arranged between two ends of one of the (N−1) substrings, and in this case N>2. It should be noted that the above shows preferred solutions. In practical applications, the N pairs of bypass ports may be arranged for one or some substrings in the photovoltaic module, each of which is provided with the first controllable switch connected in parallel with the substring, while each of other substrings than the one or some substrings is only provided with an antiparallel diode. The setting of the N pairs of bypass ports is not limited thereto, which may depend on application environments.

FIG. 1 shows a case that the photovoltaic module includes three substrings 60, each of which is provided with a first driving circuit 20 and a first controllable switch 30. The following description is given by taking the case shown in FIG. 1 as an example.

Each substring 60 corresponds to one first controllable switch 30, and each first controllable switch 30 corresponds to one first driving circuit 20. Each first controllable switch 30 is driven by the corresponding first driving circuit 20 under control of the controller 10, to bypass the substring 60 connected in parallel with the first controllable switch 30, so as to achieve independent protection for the substring 60.

The first controllable switch 30 includes a first switch 301 and a first diode 302. The first diode 302 is connected in antiparallel with the corresponding substring 60, and the first switch 301 is connected in parallel with the corresponding substring 60. A control end of the first switch 301 is connected to one output end of the controller 10 via the corresponding first driving circuit 20, so that the first switch 301 receives a control signal transmitted by the controller 10 via the corresponding first driving circuit 20. The first switch 301 is turned on or turned off based on the received control signal. The first switch 301 may be implemented by a relay, a triode or a switch transistor. The first diode 302 may be implemented by a bypass diode provided in the photovoltaic module, or may be implemented by a diode installed together with the first switch 301. The first controllable switch 30 may be implemented by a triode having a body diode or a switch transistor having a body diode. The implementations of the above components are not limited thereto, which may depend on the application environments.

The sampling unit 40 is configured to: detect, for each first controllable switch 30, analog quantity information of the first controllable switch 30. An output end of the sampling unit 40 is connected to an input end of the controller 10. The sampling unit 40 generates a sampling signal based on the analog quantity information and provides the sampling signal to the controller 10. The analog quantity information of the first controllable switch 30 that may be acquired by the sampling unit 40 is one of a voltage, a current, power, and a branch temperature, which is not limited herein and may be depend on the application environments.

The controller 10 operates on power supplied by the power source 50, and determines, based on the sampling signal provided by the sampling unit 40, whether the analog quantity information of the first controllable switch 30 meets a predetermined bypass condition. If it is determined that the analog quantity information of the first controllable switch 30 meets the predetermined bypass condition, the controller 10 controls the first switch 301 in the first controllable switch 30 to be turned on by using the corresponding first driving circuit 20. Since an internal resistance of the first switch 301 is smaller than that of the first diode 302, a current generated by the corresponding substring 60 is mainly or completely transmitted through the first switch 301 in the conductive state, so that power consumption of the first diode 302 in the first controllable switch 30 in the conductive state is reduced.

With the active bypass control device for a photovoltaic module according this embodiment, the first diode in the first controllable switch is prevented from having a large power consumption due to a large current, thereby solving problems in the conventional technology of low reliability, high cost and large system loss caused by the large power consumption of the first diode.

It should be noted that, in actual applications, if the first switch in the first controllable switch corresponding to a shaded photovoltaic power generation unit is kept in the conductive state, an output end of the photovoltaic power generation unit is kept in the short-circuited state, and the outputted current is transmitted through the first switch. In this case, even if the shaded photovoltaic power generation unit is no longer unshaded to restore to a normal operation state, the photovoltaic power generation unit can not provide power abnormally, which is apparently unreasonable.

Based on the above embodiment, an active bypass control device of a photovoltaic module is further provided according to another embodiment of the present disclosure. In this embodiment, after controlling the first switch to be turned on by the corresponding first driving circuit, the controller counts a time period during which the first switch is turned on. When the time period during which the first switch is turned on exceeds a first preset time period, the controller transmits a control signal to the corresponding first driving circuit, to control the corresponding first switch to be turned off by using the first driving circuit, so that the corresponding photovoltaic power generation unit is no longer forward short-circuited by the first switch.

The controller re-receives the sampling signal of the photovoltaic power generation unit provided by the sampling unit, and determines whether the analog quantity information of the corresponding first controllable switch meets the predetermined bypass condition. If the photovoltaic power generation unit is no longer unshaded, the photovoltaic power generation unit may be re-connected to a power supply network for normal operation. If the photovoltaic power generation unit is still shaded and can not operate normally, the controller controls the corresponding first switch to be turned on again based on the sampling signal provided by the sampling unit, so that the current of the photovoltaic power generation unit is transmitted through the first switch. The controller performs the counting again, and the above process is repeatedly performed until the photovoltaic power generation unit is no longer unshaded. Then, the controller controls the first switch to be turned off, so that the output end of the photovoltaic power generation unit is no longer short-circuited. The photovoltaic power generation unit is connected to the power supply network for the normal operation.

Other structures and operation principles in this embodiment are the same as those in the above embodiments, which are not repeated herein.

Based on the above embodiments, the sampling process and the determination process are described in detail below.

In an embodiment, after receiving the sampling signal, the controller 10 may further perform software filtering on the received sampling signal to filter out electromagnetic interference to the sampling signal during transmission, so as to improve the accuracy of the controller 10 in determining whether the analog quantity information of the first controllable switch 30 meets the predetermined bypass condition, and thus the controller 10 transmits the control signal to the corresponding first driving circuit 20 in time and accurately.

The first controllable switch may have different circuit structures due to different analog quantity information acquired by the sampling unit, and the predetermined bypass condition may also vary with the analog quantity information.

Figure 2:
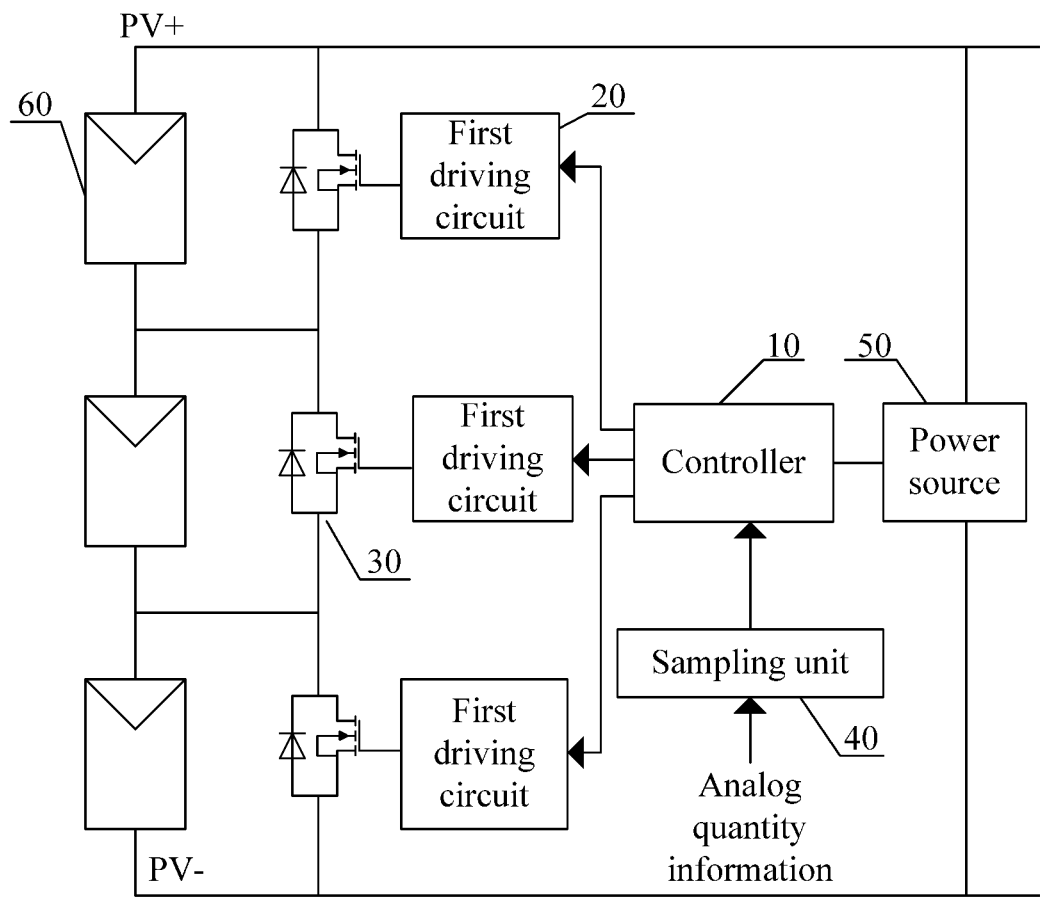
FIG. 2 is a schematic diagram showing an active bypass control device for a photovoltaic module according to another embodiment of the present disclosure.

Reference is made to FIG. 2, which is schematic diagram showing an active bypass control device for a photovoltaic module according to another embodiment of the present disclosure. The first controllable switch 30 is implemented by a switch transistor having a body diode, and other structures in this embodiment are the same as the embodiment shown in FIG. 1, which are not repeated herein.

The body diode in the first controllable switch 30 is connected in antiparallel with the corresponding substring 60, and a component realizing the switch function in the first controllable switch 30 is connected in parallel with the substring 60. The sampling unit 40 acquires a voltage of the first controllable switch 30. The sampling unit 40 may directly acquire voltages of the first controllable switches 30. Alternatively, the sampling unit 40 may acquire voltages at nodes, and obtains the voltages of the first controllable switches 30 by subtraction between adjacent nodes.

In a case that the sampling unit acquires the voltage of the first controllable switch, the predetermined bypass condition is that, the number of times that the voltage of the first controllable switch is lower than a preset voltage threshold is greater than or equal to a preset number of times, or a time period during which the voltage of the first controllable switch is lower than the preset voltage threshold is greater than or equal to a second preset time period.

Figure 3:
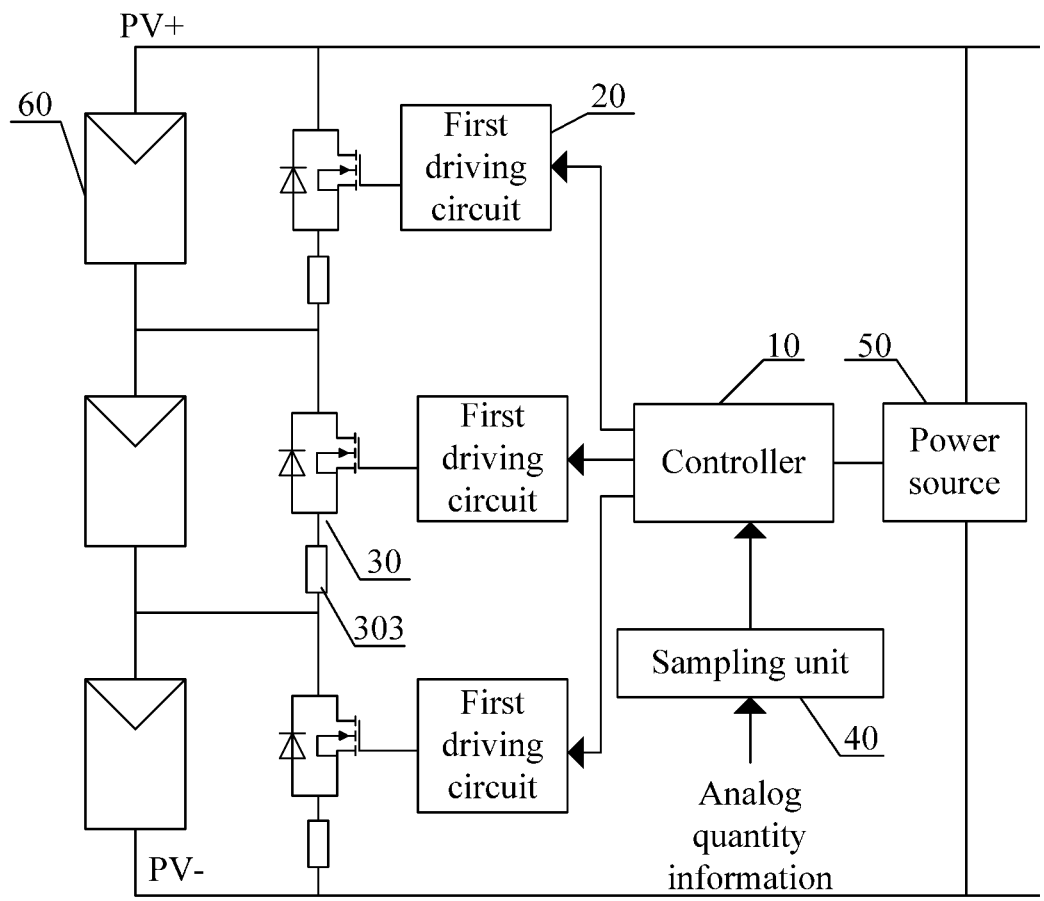
FIG. 3 is a schematic diagram showing an active bypass control device for a photovoltaic module according to another embodiment of the present disclosure.

Reference is made to FIG. 3, which is schematic diagram showing an active bypass control device for a photovoltaic module according to another embodiment of the present disclosure. Based on the embodiment shown in FIG. 2, a sampling resistor 303 is connected in series in a loop of the first controllable switch 30, and is used to acquire a current of the corresponding first controllable switch 30. In an embodiment, the current of the first controllable switches 30 may be acquired by a current sensor. The sampling resistor 303 or the current sensor may be arranged between the first controllable switch 30 and a positive terminal or a negative terminal of the substring 60. In this case, a correct current may be obtained.

In a case that the sampling unit acquires the current of the first controllable switch, the predetermined bypass condition is that, the number of times that the current of the first controllable switch is greater than a preset current threshold is greater than or equal to a preset number of times, or a time period during which the current of the first controllable switch is greater than a preset current threshold is greater than or equal to a second preset time period.

Further, the analog quantity information of the first controllable switch may also be the power or the branch temperature. In a case that the analog quantity information is the power, the predetermined bypass condition is that, the number of times that the power of the first controllable switch is greater than a preset power threshold is greater than or equal to a preset number of times, or a time period during which the power of the first controllable switch is greater than the preset power threshold is greater than or equal to a second preset time period. In a case that the analog quantity information is the branch temperature, the predetermined bypass condition is that, the number of times that the branch temperature of the first controllable switch is higher than a preset temperature threshold is greater than or equal to a preset number of times, or a time period during which the branch temperature of the first controllable switch is greater than the preset temperature threshold is greater than or equal to a second preset time period.

It should be noted that the preset number of times and the second preset time period are set in order to avoid a detection error and improve detection accuracy, so that a determination result of the controller is reliable. The preset number of times and the second preset time period may be set according to the application environments, which are not limited herein. Further, the analog quantity information of the first controllable switch is not limited to those described in the embodiments of the present disclosure, as long as the analog quantity information can indicate a physical state of the first controllable switch.

Figure 4:
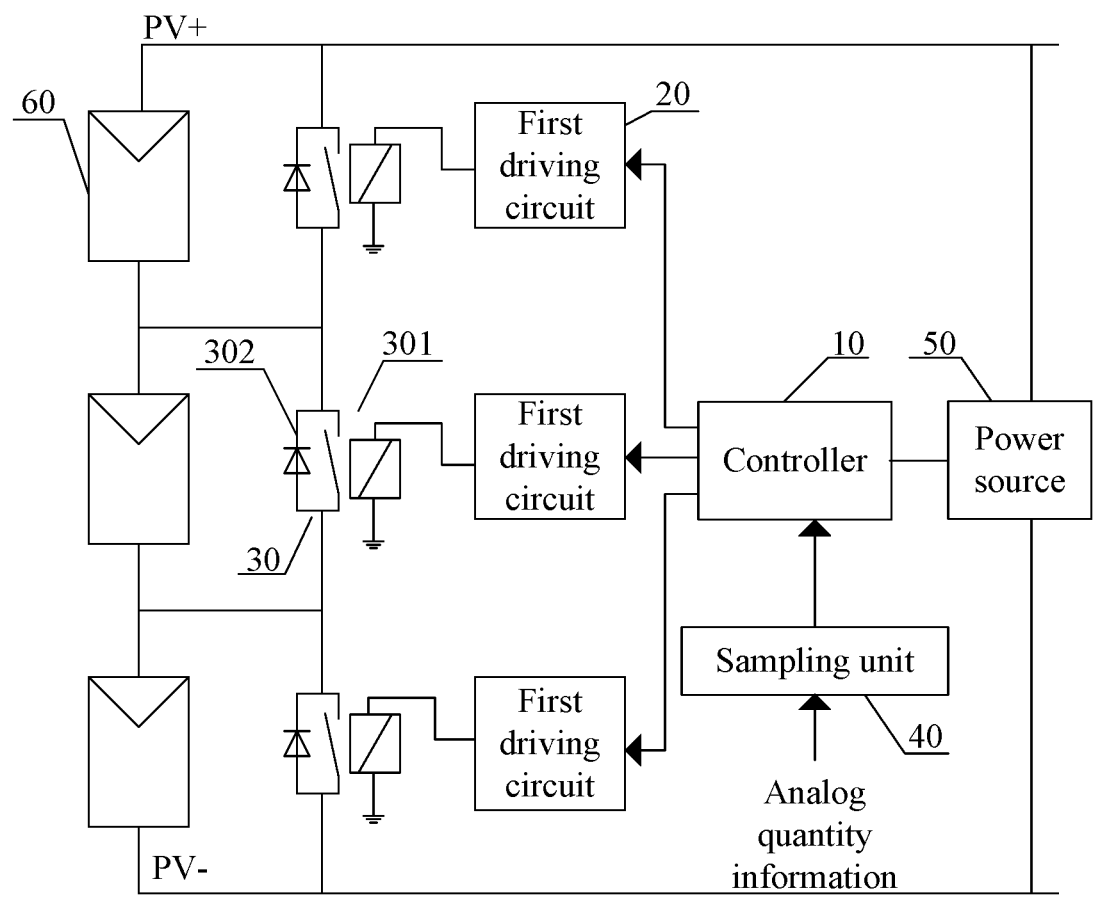
FIG. 4 is a schematic diagram showing an active bypass control device for a photovoltaic module according to another embodiment of the present disclosure.

Reference is made to FIG. 4, which is a schematic diagram showing an active bypass control device for a photovoltaic module according to another embodiment of the present disclosure. It can be seen from FIG. 4 that, the first switch 301 in the first controllable switch 30 is implemented by a relay. The first driving circuit 20 transmits a drive current to a coil of the relay based on the control signal of the controller 10, so that the coil of the relay is energized. After the coil of the relay is energized, a normally open contact of the relay is controlled to be closed. The output current of the corresponding substring 60 may be transmitted through the contact of the relay, so that the power consumption of the first diode 302 can be reduced.

In the embodiment shown in FIG. 4, the analog quantity information of the first controllable switch 30 may also be acquired by the sampling unit, which is not repeated herein.

Other structures and operation principles in this embodiment are the same as those in the above embodiments, which are not repeated herein.

Figure 5:
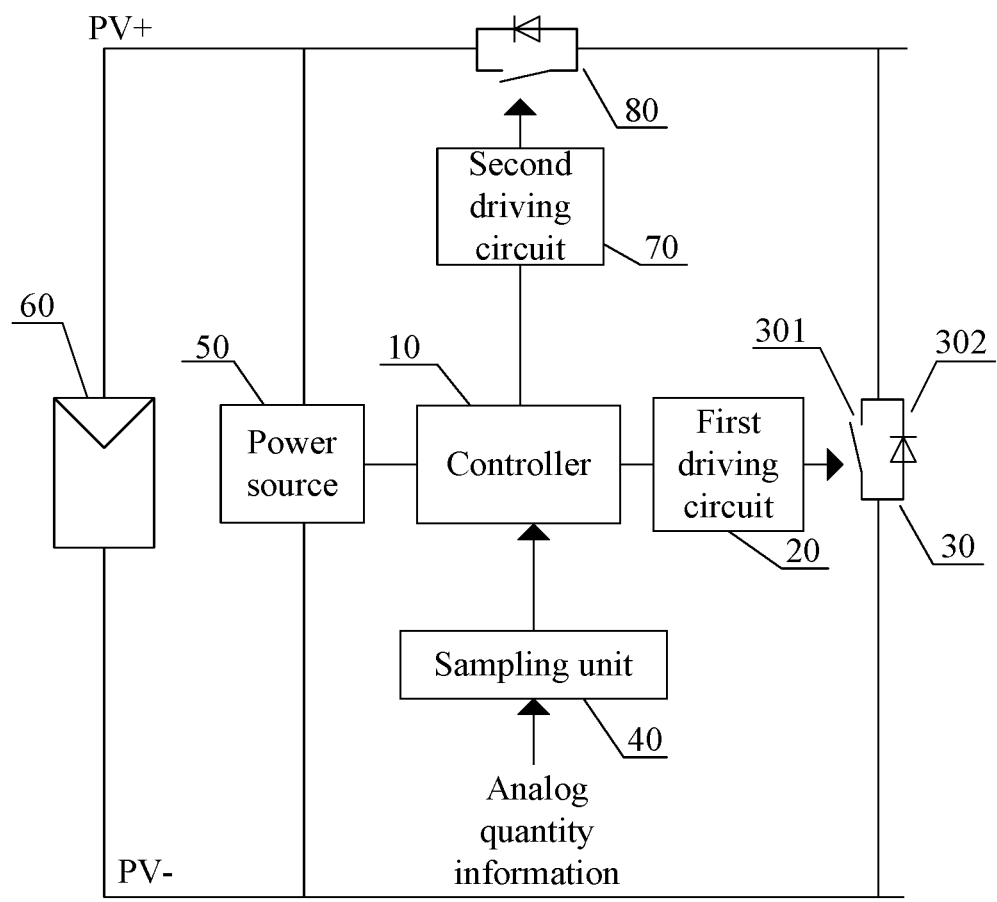
FIG. 5 is a schematic diagram showing an active bypass control device for a photovoltaic module according to another embodiment of the present disclosure.

The active bypass control device according to any one above embodiment may be used separately or integrated in a shutdown device or an optimizer of the photovoltaic module. Reference is made to FIG. 5, which is a schematic diagram showing a shutdown device of a photovoltaic module according to an embodiment of the present disclosure. In this embodiment, N=1, the photovoltaic power generation unit is implemented as a photovoltaic module. Based on any of the above embodiments, the active bypass control device further includes a second driving circuit 70 and a second controllable switch 80. The first controllable switch 30 and the photovoltaic module 60 are indirectly connected in parallel with each other via the second controllable switch 80. That is, the second controllable switch 80 is connected between the first controllable switch 30 and the photovoltaic module 60, and a control end of the second controllable switch 80 is connected to the other output end of the controller 10 via the second driving circuit 70.

In this embodiment, for the photovoltaic module 60, only one of the first controllable switch 30 and the second controllable switch 80 is turned on at any time instant. In a case that the photovoltaic module 60 is in a normal condition, the controller 10 controls the second controllable switch 80 to be turned on by using the second driving circuit 70, to connect the photovoltaic module 60 to the power supply network. In a case that the photovoltaic module 60 is in an abnormal condition, the controller 10 controls the second controllable switch 80 to be turned off by using the second driving circuit 70 to disconnect the photovoltaic module 60 from the power supply network.

With the technical solutions according to the embodiment of the present disclosure, a shaded photovoltaic module can be removed from the power supply network, and the outputted electric energy of the shaded photovoltaic module can be controlled to ensure the normal operation of unshaded photovoltaic modules, thereby improving the reliability of the power supply network.

Other structures and operation principles in this embodiment are the same as those in the above embodiments, which are not repeated herein.

An active bypass control method for a photovoltaic module is further provided according to an embodiment of the present disclosure.

Figure 6:
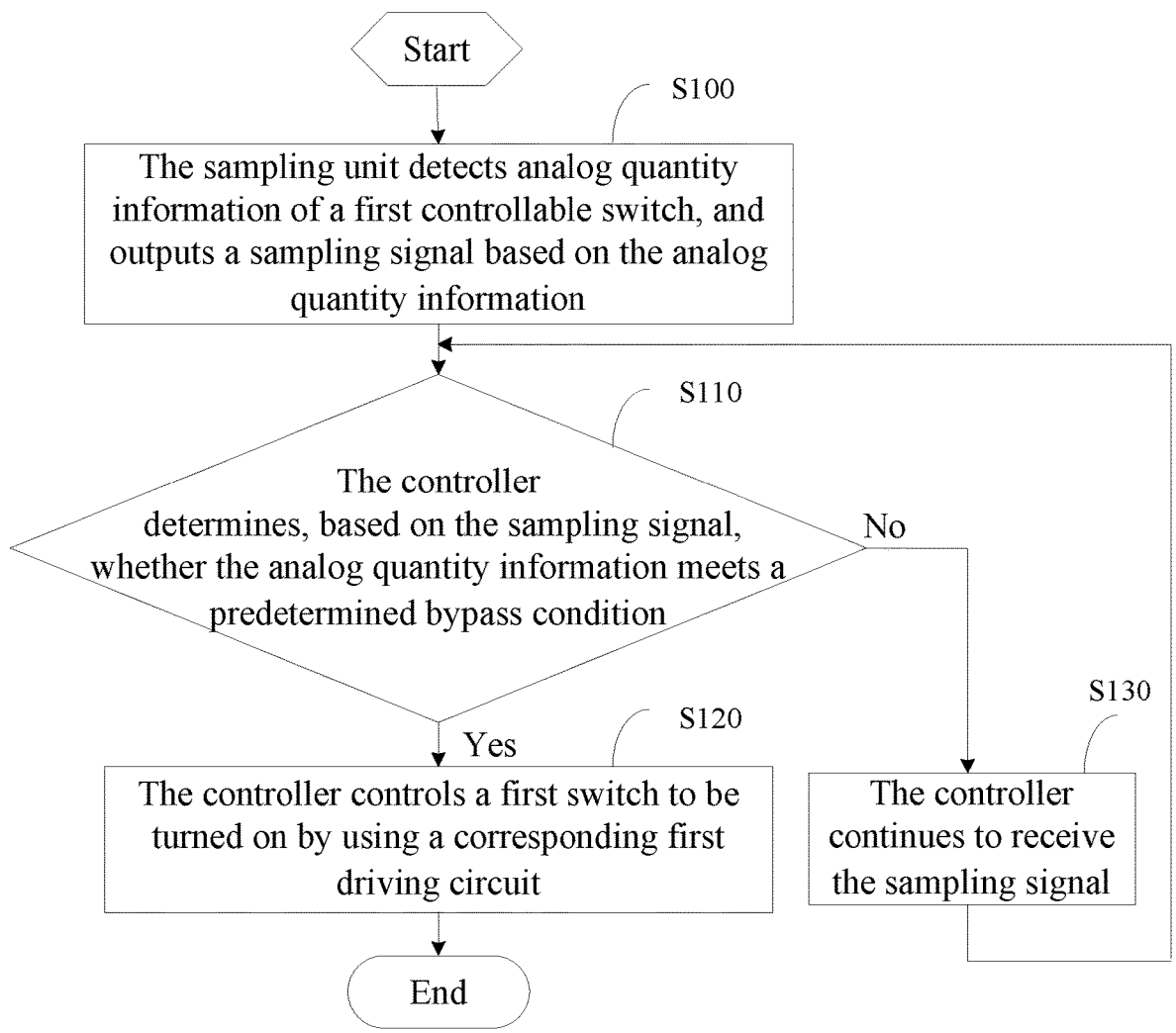
FIG. 6 is a flowchart showing an active bypass control method for a photovoltaic module according to an embodiment of the present disclosure.

Reference is made to FIG. 6, which is a flowchart showing an active bypass control method for a photovoltaic module according to an embodiment of the present disclosure. The active bypass control method is applied to a control module in the active bypass control device for a photovoltaic module. As shown in FIG. 6, the active bypass control method may include the following steps S100 to S130.

In step S100, a sampling unit detects analog quantity information of a first controllable switch, and outputs a sampling signal based on the analog quantity information.

The sampling unit detects the analog quantity information of the first controllable switch corresponding to the photovoltaic power generation unit, and outputs the sampling signal generated based on the analog quantity information to a controller. The analog quantity information may be one of a voltage, a current, power, and a branch temperature.

In step S110, a controller determines, based on the sampling signal, whether the analog quantity information meets a predetermined bypass condition. If the analog quantity information meets the predetermined bypass condition, the method proceeds to step S120. If the analog quantity information does not meet the predetermined bypass condition, the method proceeds to step S130.

The controller determines, based on the sampling signal provided by the sampling unit, whether the analog quantity information of the first controllable switch corresponding to the sampling signal meets the predetermined bypass condition. If the predetermined bypass condition is met, step S120 is performed. If the predetermined bypass condition is not met, step S130 is performed.

In step S120, the controller controls a first switch in the first controllable switch to be turned on by using a first driving circuit corresponding to the first controllable switch.

In a case that the analog quantity information of the first controllable switch meets the predetermined bypass condition, the controller outputs a control signal to the corresponding first driving circuit, and controls the first switch in the first controllable switch to be turned on by using the first driving circuit, so that the current generated by the shaded photovoltaic power generation unit is transmitted through the first switch, thereby preventing the first diode in the first controllable switch from having a large power consumption due to a large current.

In step S130, the controller continues to receive the sampling signal.

In a case that the analog quantity information of the first controllable switch does not meet the predetermined bypass condition, the controller continues to receive the sampling signal provided by the sampling unit.

With the active bypass control method for a photovoltaic module according to this embodiment, the controller reads the sampling signal provided by the sampling unit, which may reflect the state of the first controllable switch. If the controller determines, based on the sampling signal, that the first diode in the first controllable switch is in the conductive state, the controller transmits a control signal to the corresponding first driving circuit, to control the first switch to be turned on by using the first driving circuit. Since an internal resistance of the first switch is smaller than that of the first diode, the current generated by the shaded photovoltaic power generation unit is transmitted through the first switch in the conductive state, so that the first diode in the first controllable switch is prevented from having a large power consumption, thereby solving problems in the conventional technology of low reliability, high cost and large system loss caused by the large power consumption of the first diode.

Figure 7:
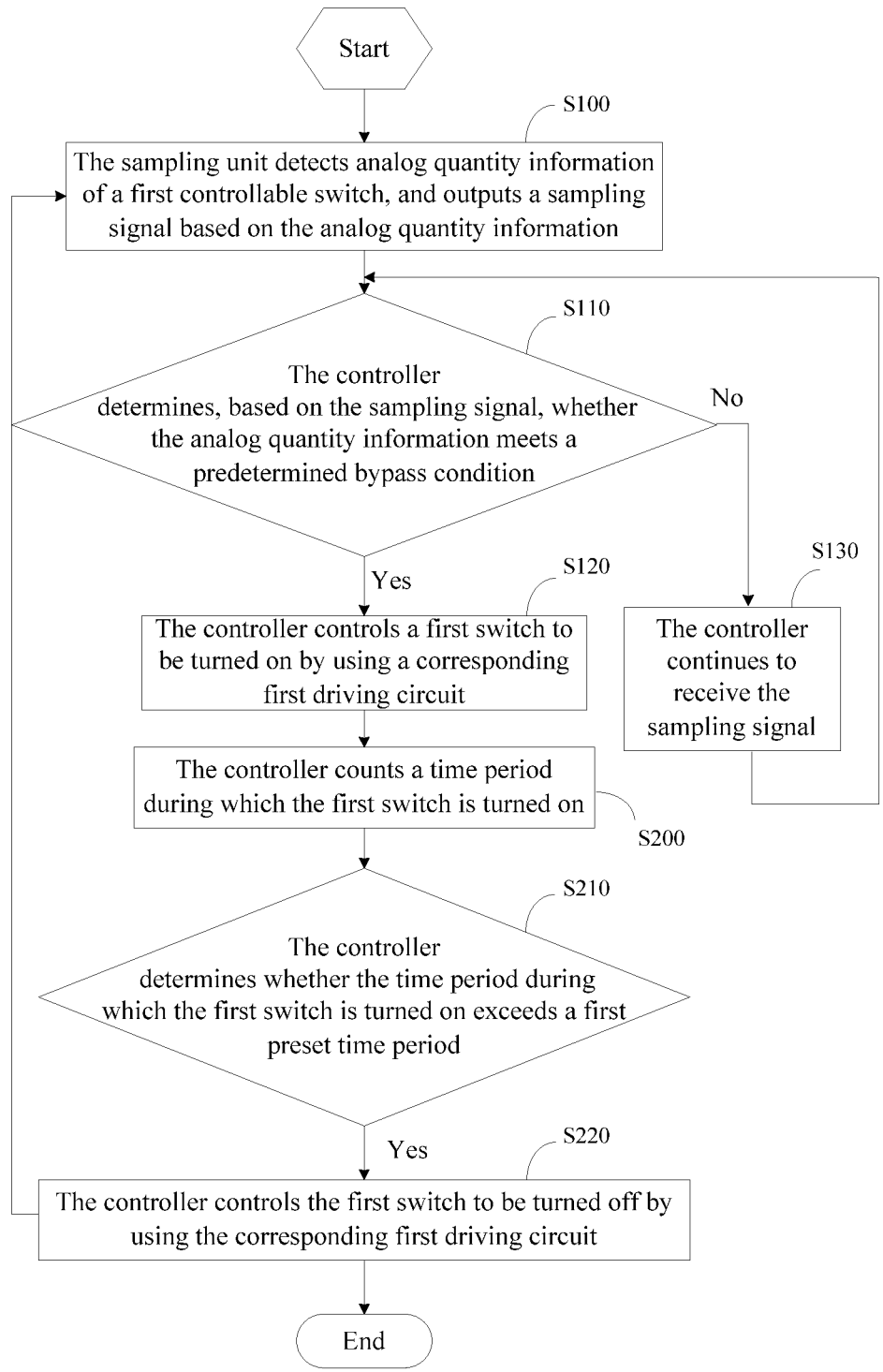
FIG. 7 is a flowchart showing an active bypass control method for a photovoltaic module according to another embodiment of the present disclosure.

Reference is made to FIG. 7, which is a flowchart showing an active bypass control method for a photovoltaic module according to another embodiment of the present disclosure. Based on the active bypass control method for a photovoltaic module shown in FIG. 6, the active bypass control method shown in FIG. 7 may further include the following steps S200 to S220.

In step S200, the controller counts a time period during which the first switch is turned on.

Upon issue of the control command for controlling the first switch to be turned on, the controller counts the time period during which the first switch is turned on, i.e., counts a time period during which the first switch is in the conductive state.

In step S210, the controller determines whether the time period during which the first switch is turned on exceeds a first preset time period. If the time period during which the first switch is turned on exceeds the first preset time period, the method proceeds to step S220.

In a case that the controller determines that the time period during which the first switch is turned on exceeds the first preset time period, step S220 is performed.

In step S220, the controller controls the first switch to be turned off by using the corresponding first driving circuit.

In the case that the controller determines that the time period during which the first switch is turned on exceeds the first preset time period, the controller transmits a control command to the corresponding first driving circuit again to control the first switch to be turned off. In this case, the current generated by the corresponding photovoltaic power generation unit is no longer transmitted through the first switch.

After step S220 is performed, step S100 is repeated.

After the controller controls the first switch to be turned off, the controller re-reads the sampling signal provided by the sampling unit, and outputs a control signal based on the obtained sampling signal.

With the active bypass control method for a photovoltaic module according to this embodiment, the controller counts the time period during which the first switch is in the conductive state. In the case that the time period during which the first switch is in the conductive state exceeds the first preset time period, the controller controls the first switch to be turned off, and step S100 is performed again to continue monitoring the analog quantity information of the first controllable switch. In the active bypass control method according to this embodiment, by cyclically controlling the first switch to be turned on or off, the first switch is prevented from being kept in the conductive state after being turned on once, thereby avoiding that the shaded photovoltaic power generation unit, after being unshaded, cannot be reconnected to the power supply network for the normal operation. In this way, the power consumption of the first diode in the first controllable switch can be reduced, and the shaded photovoltaic power generation unit, after being unshaded, can be reconnected to the power supply network in time, thereby improving the utilization rate of the photovoltaic power generation unit.

In an embodiment, corresponding to the active bypass control device for a photovoltaic module shown in FIG. 5, the active bypass control method for a photovoltaic module shown in FIG. 6 or FIG. 7 may further include the following processes before step S100 is performed.

In a case that the photovoltaic module is in a normal condition, the controller controls a second controllable switch to be turned on by using a corresponding second driving circuit.

In a case that the photovoltaic module is in an abnormal condition, the controller controls the second controllable switch to be turned off by using the corresponding second driving circuit.

With the active bypass control method for a photovoltaic power generation unit according to this embodiment, a shaded photovoltaic module can be removed from the power supply network, and the outputted electric energy of the shaded photovoltaic module can be controlled to ensure the normal operation of unshaded photovoltaic modules, thereby improving the reliability of the power supply network. Other operation principles in this embodiment are the same as those in the above embodiments, which are not repeated herein.

Embodiments of the present disclosure are described in a progressive manner, each of the embodiments emphasizes differences from other embodiments, and the same or similar parts among the embodiments can be referred to each other. For the device disclosed in the embodiments, since the device corresponds to the method disclosed in the embodiments, the description is relatively simple, and the related parts can be referred to the description of the method.

The foregoing embodiments are only preferred embodiments of the present disclosure and are not meant to limit the present disclosure. The preferred embodiments according to the present disclosure are disclosed above, and are not intended to limit the present disclosure. Those skilled in the art may make, based on the disclosed method and technical content, some variations and improvements on the technical solutions of the present disclosure, or make some equivalent variations on the embodiments without departing from the scope of the technical solutions. All simple modifications, equivalent variations and improvements made based on the technical essence fall in the scope of the technical solutions of the present disclosure.

The invention claimed is:

1. An active bypass control device for a photovoltaic module, the active bypass control device comprising:
a power source;
a sampling unit;
a controller;
N first driving circuits; N pair of bypass ports; and
N first controllable switches, wherein
N is a positive integer; the N first driving circuits, the N pair of bypass ports, and the N first controllable switches are arranged in one-to-one correspondence;
an output end of the power source is connected to a power supply end of the controller;
an output end of the sampling unit is connected to an input end of the controller;
each of the N first controllable switches is connected between one of the N pairs of bypass ports, and each of the N first controllable switches comprises a first switch and a first diode that are antiparallel, the first diode is reversely connected between the one of the N pairs of bypass ports, and a control end of the first switch is connected to one output end of the controller via one of the N first driving circuits;
the sampling unit is configured to: detect, for each of the N first controllable switches, analog quantity information of each of the N first controllable switches, and output a sampling signal based on the analog quantity information; and
the controller is configured to: determine, based on the sampling signal, whether the analog quantity information of each of the N first controllable switches meets a predetermined bypass condition; and control, in a case that the analog quantity information of a first controllable switch meets the predetermined bypass condition, the first switch in the first controllable switch to be turned on by using a first driving circuit corresponding to the first controllable switch;
wherein the analog quantity information is one of a voltage, a current, power, and a branch temperature;
in a case that the analog quantity information is the voltage, the predetermined bypass condition is that the number of times that a voltage of the first controllable switch is lower than a preset voltage threshold being greater than or equal to a preset number of times, or a time period during which the voltage of the first controllable switch is lower than the preset voltage threshold being greater than or equal to a second preset time period;

in a case that the analog quantity information is the current, the predetermined bypass condition is that the number of times that a current of the first controllable switch is greater than a preset current threshold being greater than or equal to a preset number of times, or a time period during which the current of the first controllable switch is greater than the preset current threshold being greater than or equal to a second preset time period;

in a case that the analog quantity information is the power, the predetermined bypass condition is that the number of times that power of the first controllable switch is greater than a preset power threshold being greater than or equal to a preset number of times, or a time period during which the power of the first controllable switch is greater than the preset power threshold being greater than or equal to a second preset time period; and in a case that the analog quantity information is the branch temperature, the predetermined bypass condition is that the number of times that a branch temperature of the first controllable switch is higher than a preset temperature threshold being greater than or equal to a preset number of times, or a time period during which the branch temperature of the first controllable switch is greater than the preset temperature threshold being greater than or equal to a second preset time period.

2. The active bypass control device for a photovoltaic module according to claim 1, wherein the controller is further configured to: after controlling the first switch in the first controllable switch to be turned on, control the first switch to be turned off by using the first driving circuit corresponding to the first controllable switch in a case that a time period during which the first switch is turned on exceeds a first preset time period; and determine, based on a sampling signal outputted by the sampling unit after performing re-detecting on the first controllable switch, whether the analog quantity information corresponding to the sampling signal meets the predetermined bypass condition.

3. The active bypass control device for a photovoltaic module according to claim 1, wherein the controller is further configured to: before determining whether the analog quantity information meets the predetermined bypass condition, perform software filtering on the sampling signal.

4. The active bypass control device for a photovoltaic module according to claim 1, wherein each of the N first controllable switches is a triode having a body diode or a switch transistor having a body diode; and the first switch is a relay, a triode or a switch transistor.

5. The active bypass control device for a photovoltaic module according to claim 1, wherein an input end of the power source is connected between two ends of the photovoltaic module.

6. The active bypass control device for a photovoltaic module according to claim 1, wherein the N pairs of bypass ports are arranged between two ends of the photovoltaic module; or the N pairs of bypass ports are arranged between two ends of at least one substring in the photovoltaic module; or the N pairs of bypass ports are arranged between two ends of the photovoltaic module and two ends of at least one substring in the photovoltaic module.

7. The active bypass control device for a photovoltaic module according to claim 6, wherein in a case that the N pairs of bypass ports are arranged between the two ends of the photovoltaic module and the active bypass control device for a photovoltaic module is applied to a shutdown device, the other output end of the controller is connected to a control end of a second controllable switch in the shutdown device via a second driving circuit;

the second controllable switch is connected between a first controllable switch and the photovoltaic module; and the controller is further configured to:

control the second controllable switch to be turned on by using the second driving circuit in a case that the photovoltaic module is in a normal condition; and control the second controllable switch to be turned off by using the second driving circuit in a case that the photovoltaic module is in an abnormal condition.

8. An active bypass control method for a photovoltaic module, applied to an active bypass control device for a photovoltaic module, wherein the active bypass control device comprises a power source, a sampling unit, a controller, N first driving circuits, N pairs of bypass ports, and N first controllable switches, and N is a positive integer, the N first driving circuits, the N pair of bypass ports, and the N first controllable switches are arranged in one-to-one correspondence; an output end of the power source is connected to a power supply end of the controller; an output end of the sampling unit is connected to an input end of the controller; each of the N first controllable switches is connected between one of the N pairs of bypass ports, and each of the N first controllable switches comprises a first switch and a first diode that are antiparallel; the first diode is reversely connected between one of the N pairs of bypass ports, and a control end of the first switch is connected to one output end of the controller via one of the N first driving circuits, and wherein the active bypass control method comprises:

detecting, by the sampling unit for each of the N first controllable switches, analog quantity information of each of the N first controllable switches, and outputting, by the sampling unit, a sampling signal based on the analog quantity information;

determining, by the controller based on the sampling signal, whether the analog quantity information of each of the N first controllable switches meets a predetermined bypass condition; and controlling, by the controller, the first switch in a first controllable switch to be turned on by using a first driving circuit corresponding to the first controllable switch in a case that the analog quantity information of the first controllable switch meets the predetermined bypass condition;

wherein the analog quantity information is one of a voltage, a current, power, and a branch temperature;

in a case that the analog quantity information is the voltage, the predetermined bypass condition is that the number of times that a voltage of the first controllable switch is lower than a preset voltage threshold being greater than or equal to a preset number of times, or a time period during which the voltage of the first controllable switch is lower than the preset voltage threshold being greater than or equal to a second preset time period;

in a case that the analog quantity information is the current, the predetermined bypass condition is that the number of times that a current of the first controllable switch is greater than a preset current threshold being greater than or equal to a preset number of times, or a time period during which the current of the first controllable switch is greater than the preset current threshold being greater than or equal to a second preset time period;

in a case that the analog quantity information is the power, the predetermined bypass condition is that the number of times that power of the first controllable switch is greater than a preset power threshold being greater than or equal to a preset number of times, or a time period during which the power of the first controllable switch is greater than the preset power threshold being greater than or equal to a second preset time period; and in a case that the analog quantity information is the branch temperature, the predetermined bypass condition is that the number of times that a branch temperature of the first controllable switch is higher than a preset temperature threshold being greater than or equal to a preset number of times, or a time period during which the branch temperature of the first controllable switch is greater than the preset temperature threshold being greater than or equal to a second preset time period.

9. The active bypass control method for a photovoltaic module according to claim 8, wherein after controlling the first switch in the first controllable switch to be turned on, the active bypass control method further comprises:

counting, by the controller, a time period during which the first switch is turned on;

determining, by the controller, whether the time period during which the first switch is turned on exceeds a first preset time period;

controlling, by the controller, the first switch to be turned off by using the first driving circuit corresponding to the first controllable switch in a case that the time period during which the first switch is turned on exceeds the first preset time period; and re-detecting, by the sampling unit, analog quantity information of the first controllable switch, and re-outputting, by the sampling unit, a sampling signal based on the analog quantity information.

\* \* \* \* \*